E. EBERLY.
Thill-Coupling Jack.
No. 216,262. Patented June 10, 1879.
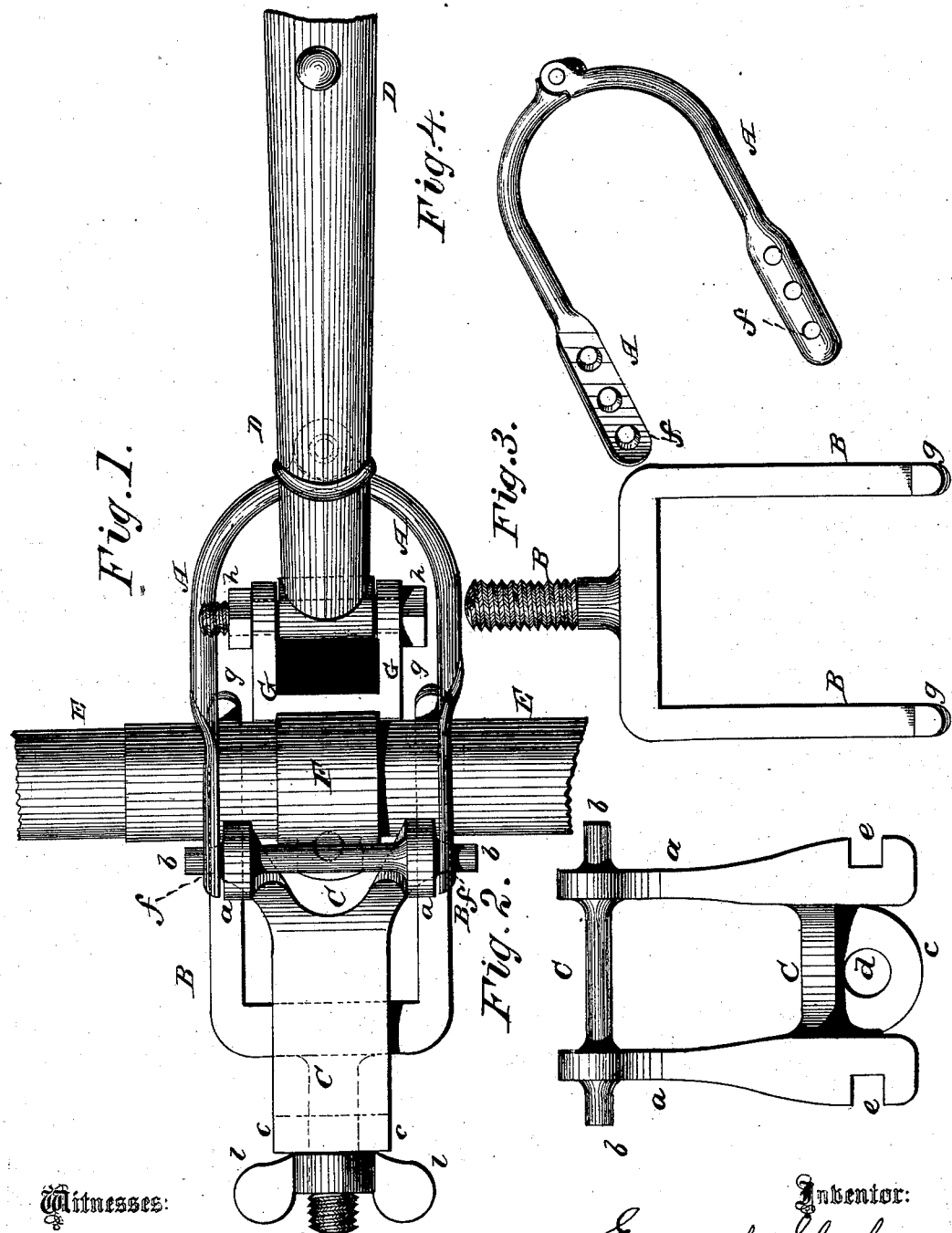
Witnesses:
P. C. Dietench.
Frank H. Duffy.
Inventor:
Emanuel Eberly.
Per Manahan & Ward, Attorneys.

UNITED STATES PATENT OFFICE.

EMANUEL EBERLY, OF STERLING, ILLINOIS, ASSIGNOR TO JOHN V. EMMITT AND HENRY C. WARD, OF SAME PLACE, ONE-THIRD TO EACH; SAID WARD ASSIGNOR TO SAID EMMITT.

IMPROVEMENT IN THILL-COUPLING JACKS.

Specification forming part of Letters Patent No. 216,262, dated June 10, 1879; application filed October 22, 1878.

*To all whom it may concern:*

Be it known that I, EMANUEL EBERLY, of the city of Sterling, in the county of Whiteside and State of Illinois, have invented certain new and useful Improvements in Shaft-Rubber Jacks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has reference to an improved jack for setting the rubbers in the heel of the shafts or thills of a vehicle, and consists, essentially, in the combination of parts hereinafter described to compress such rubber.

Figure 1 represents my invention in operation, attached to a section of a shaft. Figs. 2, 3, and 4 are detached views of the parts of the jack.

A is a stirrup, hinged at its center, and having a series of holes made laterally through both of its ends. B is a bifurcated clutch, having its forward ends turned slightly up at $g$ $g$ to engage the front side of the axle E, and having its rear end furnished with a thread and nut, $l$, as shown. C is an L-shaped brace, having its shorter arms, $a$ $a$, extending perpendicularly, the ends of such arms having rounded lateral projections $b$ $b$, fitted to enter the holes referred to in the stirrup A. The larger arm of the brace C extends horizontally backward, and at its rear end has a downward-extending shoulder, $c$, through which is made the hole $d$ for the reception of the threaded end of the clutch B.

The perpendicular arms $a$ $a$ of the brace C extend below the horizontal arm, and in the outer edge of such extensions are formed the horizontal grooves $e$ $e$ for the reception of the respective limbs of the clutch B, as shown.

D is the rear end of a shaft or thill. E is a section of an axle. F is an ordinary clip, and G the rubber therein.

My invention is intended to supply a simple, cheap, and efficient mode of putting the rubber in the clip of a buggy behind the end of the shaft. The purpose of placing such rubber is to prevent the play and rattle of the shaft on the bolt passing through the end thereof, and to avoid the consequent wear of such parts by forcing between the end of the shaft or thill and the inside of the clip a piece of rubber under such pressure as to remain in place.

The advantages of such rubber are so apparent as to have led to its use upon most all light vehicles.

The use of my invention is as follows: The nut on the clutch B is withdrawn sufficient to permit the insertion of the lower part of the axle E between the ends $g$ $g$ and the perpendicular arms $a$ $a$ of the brace C, and tightened thereon by turning the nut $l$. The stirrup A is then placed on the outside of the upper end of the brace C on the projections $b$ $b$, the closed or hinged end of the stirrup being front. The rubber is laid in the clip F, and the end of the shaft passed down through the clip to position in front of the rubber G. By prying downward on the shaft, the latter acting as a lever and the stirrup as a fulcrum, the rubber is easily sufficiently compressed and held until the bolt $h$ is placed in position, when the pressure is sufficient to hold the rubber, and the machine or jack can be taken off.

The object of the hinge in the stirrup A is to render it possible to quickly place and remove it from the projections $b$ $b$, and the stirrup can be placed around the shaft after the latter is in position, instead of inserting the shaft in the stirrup.

If in the process of compressing the rubber the end of the shaft should drop below the hole in the clip, by moving the stirrup near the end of the shaft the end of the latter can be readily forced up.

The holes $f$ have their inner edges countersunk, and the projections $b$ $b$ are correspondingly tapered at their shoulder to prevent the binding of the parts.

The stirrup A may be hinged at any point with equal effect.

What I claim as my invention, and desire to secure by Letters Patent, is—

The stirrup A, having the holes f, the clutch B, provided with the adjustable thread and nut, and the brace C, having the shorter arms, a a, and the shoulder c, in combination, substantially as and for the purpose mentioned.

In testimony that I claim the foregoing as my own I affix my signature in presence of two witnesses.

EMANUEL EBERLY.

Witnesses:
 JOHN J. CUSHING,
 HENRY H. HOOVER.